(12) United States Patent
Morgan et al.

(10) Patent No.: US 9,938,844 B2
(45) Date of Patent: Apr. 10, 2018

(54) METALLIC STATOR SEAL

(75) Inventors: Victor J. Morgan, Greenville, SC (US); Neelesh N. Sarawate, Niskayuna, NY (US); David W. Weber, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1181 days.

(21) Appl. No.: 13/281,627

(22) Filed: Oct. 26, 2011

(65) Prior Publication Data

US 2013/0108418 A1   May 2, 2013

(51) Int. Cl.
*F01D 11/00* (2006.01)
*F16J 15/02* (2006.01)
*F16J 15/08* (2006.01)
*F01D 11/08* (2006.01)

(52) U.S. Cl.
CPC ............ *F01D 11/005* (2013.01); *F16J 15/02* (2013.01); *F16J 15/0812* (2013.01); *F01D 11/08* (2013.01); *F05D 2240/11* (2013.01)

(58) Field of Classification Search
CPC ........ F01D 11/08; F01D 11/12; F01D 11/127; F01D 9/02; F01D 9/041; F01D 11/005; F16J 15/02; F16J 15/08; F16J 15/10; F16J 15/0812
USPC ............ 415/139, 173.1, 173.5, 174.5, 211.2; 277/644, 650–654
See application file for complete search history.

(56) References Cited

U.S. PATENT DOCUMENTS

| | | | |
|---|---|---|---|
| 4,645,217 A | 2/1987 | Honeycutt, Jr. et al. | |
| 5,154,577 A | 10/1992 | Mellock et al. | |
| 5,168,485 A | 12/1992 | Starkweather | |
| 5,509,669 A | 4/1996 | Wolfe et al. | |
| 5,531,457 A | 7/1996 | Tibbott et al. | |
| 5,627,998 A | 5/1997 | Mondrik et al. | |
| 5,657,998 A * | 8/1997 | Dinc et al. | 277/653 |
| 5,823,741 A | 10/1998 | Predmore et al. | |
| 5,868,398 A | 2/1999 | Maier et al. | |
| 5,915,697 A | 6/1999 | Bagepalli et al. | |
| 5,934,687 A | 8/1999 | Bagepalli et al. | |
| 5,997,247 A * | 12/1999 | Arraitz et al. | 415/139 |
| 6,162,014 A | 12/2000 | Bagepalli et al. | |
| 6,220,606 B1 * | 4/2001 | Kawaguchi et al. | 277/595 |
| 6,502,825 B2 * | 1/2003 | Aksit et al. | 277/355 |
| 6,503,051 B2 | 1/2003 | Predmore | |
| 6,619,669 B2 * | 9/2003 | Zhuo et al. | 277/654 |
| 6,637,752 B2 | 10/2003 | Aksit et al. | |
| 6,733,234 B2 * | 5/2004 | Paprotna et al. | 415/138 |

(Continued)

FOREIGN PATENT DOCUMENTS

| | | | | |
|---|---|---|---|---|
| CN | 101629520 A | | 1/2010 | |
| DE | 102005019250 B3 * | | 9/2006 | F16J 15/18 |

OTHER PUBLICATIONS

U.S. Appl. No. 13/012,380, filed Jan. 24, 2011, Morgan, et al.
Translation of CN Office Action dated Feb. 27, 2015 in relation to corresponding CN application 201210417723.2.

*Primary Examiner* — Igor Kershteyn
*Assistant Examiner* — Brian P Wolcott
(74) *Attorney, Agent, or Firm* — Eversheds Sutherland (US) LLP

(57) ABSTRACT

The present application provides a seal assembly for a turbine. The seal assembly may include a first metal shim, a second metal shim, and one or more flexible layers positioned between the first metal shim and the second metal shim.

11 Claims, 2 Drawing Sheets

(56) References Cited

U.S. PATENT DOCUMENTS

| | | |
|---|---|---|
| 7,152,864 B2 | 12/2006 | Amos et al. |
| 7,334,800 B2 | 2/2008 | Minnick |
| 2002/0121744 A1 | 9/2002 | Aksit et al. |
| 2004/0052637 A1 | 3/2004 | Paprotna et al. |
| 2008/0258399 A1* | 10/2008 | Gelorme et al. .............. 277/312 |
| 2008/0298956 A1 | 12/2008 | Eastman et al. |
| 2010/0072710 A1 | 3/2010 | Morgan et al. |
| 2010/0143103 A1* | 6/2010 | Sellars et al. .............. 415/173.4 |
| 2010/0247300 A1 | 9/2010 | Morgan |

* cited by examiner

METALLIC STATOR SEAL

TECHNICAL FIELD

The present application and the resultant patent relate generally to gas turbine engines and more particularly relate to stator seals having a number of metallic layers and cloth layers for reduced leakage.

BACKGROUND OF THE INVENTION

Leakage of hot combustion gases and/or cooling flows between turbine components generally causes reduced power output and lower efficiency. For example, the hot combustion gases may be contained within the turbine by providing pressurized compressor air around the hot gas path. Leakage of high pressure cooling flows into the hot gas path thus may lead to detrimental parasitic losses. Overall efficiency thus may be improved by blocking the leakage locations while providing cooling flow only as required.

For example, current gas turbines may use cloth seals between adjacent stator components to limit the leakage of cooling flows therebetween. Such cloth seals may have a woven wire mesh cloth layer wrapped around a metal shim with a curved "shepherds hook" on either side. Manufacturing variations, however, involved in creating the shepherds hook and the overall cloth seal may impact the leakage rate therethrough. Even lower leakage rates may be achieved by using thin metal shims between the stator components. To date, however, the use of such thin metal shims in heavy duty gas turbines has not been feasible given concerns with robustness as well as manufacture and assembly issues with such seals.

There is thus a desire for an improved seal assembly for use between stator components and other components in a heavy duty gas turbine engine. Such a seal assembly may be substantially temperature resistant, wear resistant, and flexible so as to provide adequate sealing with a robust component lifetime.

SUMMARY OF THE INVENTION

The present application and the resultant patent thus provide a seal assembly for a turbine. The seal assembly may include a first metal shim, a second metal shim, and one or more flexible layers positioned between the first metal shim and the second metal shim.

The present application and the resultant patent further may provide a turbine. The turbine may include a first stator, a second stator, and a seal assembly positioned between the first stator and the second stator. The seal assembly may include a pair of metal shims surrounding one or more cloth layers.

The present application and the resultant patent further may provide a turbine. The turbine may include a first stator, a second stator, and a seal assembly positioned between the first stator and the second stator. The seal assembly may include a first metal shim in a top position, a second metal shim in a bottom position, and a first woven wire mesh and a second woven wire mesh in a middle position.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
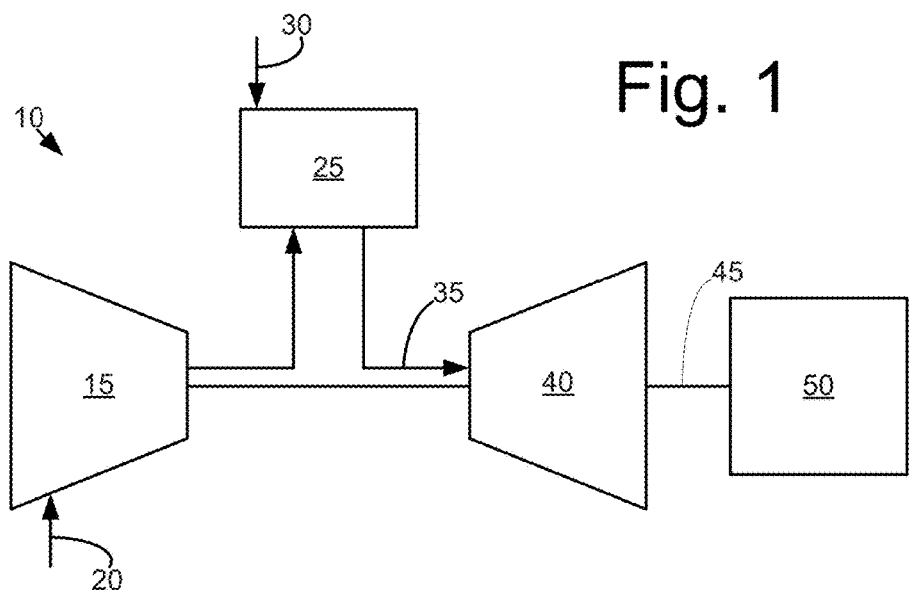
FIG. 1 is a schematic view of a gas turbine engine showing a compressor, a combustor, and a turbine.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas, and/or other types of fuels. The gas turbine engine 10 may be any one of a number of different gas turbine engines offered by General Electric Company of Schenectady, N.Y. including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
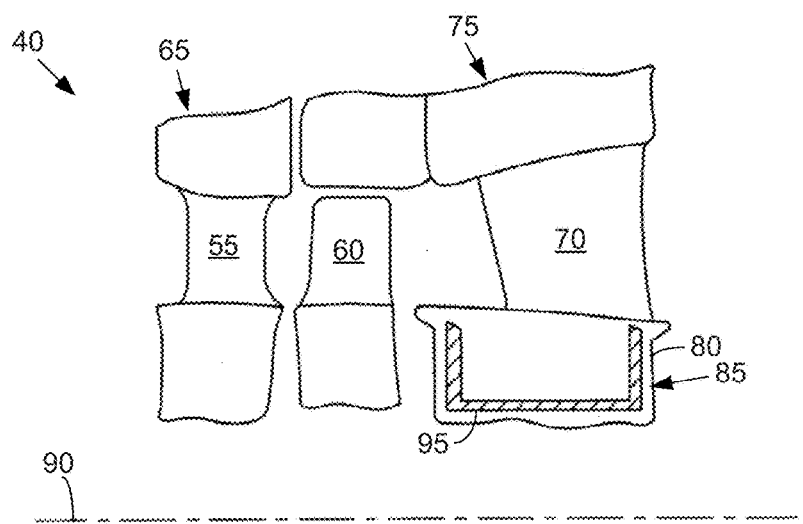
FIG. 2 is a partial side view of a turbine.

FIG. 2 shows a portion of an example of the turbine 40. Generally described, the turbine 40 may include a first stage nozzle 55 and a first stage bucket 60 in a first stage 65. Also shown is a second stage nozzle 70 of a second stage 75. Any number of stages may be used herein. The second stage nozzle 70 may be positioned about a diaphragm 80. The nozzle 70 and the diaphragm 80 form part of a stator 85. Any number of stators 85 may be positioned circumferentially about an axis 90 in each of the stages. A stator seal 95 may be positioned between adjacent stators 85 about the diaphragm 80 or elsewhere. The stator seals 95 prevent the leakage of the cooling air flows 20 from the compressor therethrough. Other components and other configurations may be used herein. For example, other components may include shrouds, casings, nozzles, transition pieces, and the like.

Figure 3:
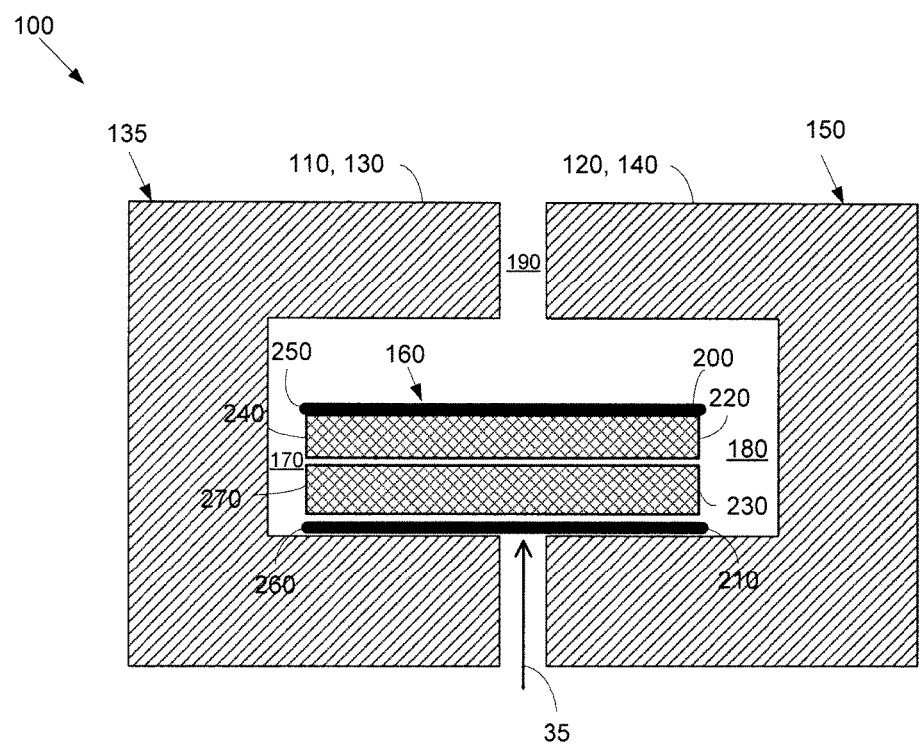
FIG. 3 is a side cross-sectional view of a stator seal assembly as may be described herein.

FIG. 3 shows portions of an example of a turbine 100 as may be described herein. Specifically, a first turbine component 110 and a second turbine component 120 are shown. The turbine components 110, 120 may be a first nozzle 130 of a first stator 135 and a second nozzle 140 of a second stator 150 as described above or any other pair of adjacent turbine components. Any number or type of turbine components may be used herein.

The turbine 100 may include a seal assembly 160 positioned between each pair of the turbine components 110, 120. The seal assembly 160 may extend from a first seal slot 170 in the first turbine component 110 to a second seal slot 180 in the second turbine component 120. The seal slots 170, 180 may have any size, shape, or configuration. The seal assembly 160 blocks a gap 190 between the components 110, 120 so as to prevent the escape of the cooling air flows 20 therethrough and the like. Other locations may be used herein.

The seal assembly 160 may include a pair of metal shims: a first metal shim 200 and a second metal shim 210. The metal shims 200, 210 may be relatively thin but solid metal stock. The metal shims 200, 210 may be made out of a high temperature resistant material such as stainless steel or a nickel based alloy Other types of materials may be used herein. Additional metal shim layers also may be used.

The seal assembly 160 also may include a pair of flexible cloth layers: a first cloth layer 220 and a second cloth layer 230. Any number of the flexible cloth layers 220, 230 may be used herein. The flexible cloth layers 220, 230 may be made out of a woven wire mesh 240 or any flexible high temperature material. For example, metal foam, a hollow box-type shim, or even additional welded shim layers and the like may be used. The first metal shim 200 may have a top position 250, the second metal shim 210 may have a bottom position 260, and the flexible cloth layers 220, 230 may have a middle position 270. (The terms "top", "bottom", "middle", reflect relative, as opposed to absolute, positions.) The metal shims 200, 210 and the flexible cloth layers 220, 230 may be coupled via high temperature adhesives, high strength fasteners, welding, and other types of conventional fastening means. The seal assembly 160 and the components thereof may have any desired size, shape, or configuration. Additional non-metallic filler materials also may be used so as to add thickness therein without impacting on overall flexibility.

The use of the metal shims 200, 210 in both the top position 250 and the bottom position 260 thus allows the seal assembly 160 to be reversible, i.e., the seal assembly 160 may be installed with either position on the load surface in the seal slots 170, 180 of the turbine components 110, 120. The metal shim layers 200, 210 act as the seal surface so as to provide low leakage rates therethrough. The metal shim 200 in the top position 250 also serves as a supplemental leakage barrier in the event that the metal shim 210 in the bottom position 260 is somehow compromised. The flexible cloth layers 220, 230 provide thickness to the seal assembly 160 without substantially increasing overall stiffness. The flexible cloth layers 220, 230 also mitigate potential assembly or maintenance concerns.

The seal assembly 160 thus provides low leakage rate similar to that possible with thin metal shim seals while eliminating the manufacturing, assembly, and robustness concerns when applied to a heavy duty gas turbine. Moreover, the seal assembly 160 may be less susceptible to manufacturing, variations as compared to existing cloth seals. The seal assembly 160 thus reduces leakage with low manufacturing and operational risks. The seal assembly 160 may be original equipment or part of a retrofit.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A seal assembly for a turbine, consisting of:
a first metal shim forming a first outermost layer of the seal assembly;
a second metal shim forming a second outermost layer of the seal assembly; and
two flexible metal shim layers positioned adjacent to one another and in between the first metal shim and the second metal shim, such that the two flexible metal shim layers are in contact with either the first metal shim or the second metal shim, such that the seal assembly is reversible in that either of the first metal shim or the second metal shim is positionable on a load surface of a seal slot to seal a gap of the load surface through which cooling air flow escapes.

2. The seal assembly of claim 1, wherein the two flexible metal shim layers are substantially planar.

3. The seal assembly of claim 1, wherein the first metal shim and the second metal shim comprise a temperature resistant material.

4. The seal assembly of claim 1, wherein either the first metal shim or the second metal shim comprises a sealing surface positioned to seal a gap between a first seal slot and a second seal slot of the turbine.

5. The seal assembly of claim 1, wherein at least one of the two flexible metal shim layers comprises a metal foam.

6. A turbine, comprising:
a first stator;
a second stator; and
a seal assembly positioned between the first stator and the second stator;
the seal assembly consisting of a pair of outermost metal shims surrounding two flexible metal shim layers adjacent to each other and positioned in between the pair of metal shims, the two flexible metal shim layers in contact with either the first metal shim or the second metal shim, wherein the seal assembly is reversible in that either of the first metal shim or the second metal shim is positionable on a load surface of a seal slot to seal a gap of the load surface through which cooling air flow escapes.

7. The turbine of claim 6, wherein the two flexible metal shim layers are substantially planar.

8. The turbine of claim 6, wherein the pair of metal shims comprises a temperature resistant material.

9. The turbine of claim 6, wherein the first stator comprises a first seal slot and the second stator comprises a second seal slot.

10. The turbine of claim 9, wherein one metal shim of the pair of metal shims comprises a sealing surface facing a gap between the first seal slot and the second seal slot.

11. A turbine, comprising:
a first stator;
a second stator; and
a seal assembly positioned between the first stator and the second stator;
the seal assembly consisting of a first metal shim in a top outermost position, a second metal shim in a bottom outermost position, and a first flexible metal shim layer and a second flexible metal shim layer positioned between the first metal shim and the second metal shim in a middle position, the first flexible metal shim layer and the second flexible metal shim layer adjacent to each other, wherein the seal assembly is reversible in that either of the first metal shim or the second metal shim is positionable on a load surface of a seal slot to seal a gap of the load surface through which cooling air flow escapes.

* * * * *